(12) United States Patent
Surendra et al.

(10) Patent No.: US 7,440,768 B2
(45) Date of Patent: Oct. 21, 2008

(54) MONITORING AVAILABILITY OF SELECTIVE CALL RADIOS IN A HALF-DUPLEX RADIO COMMUNICATION SYSTEM

(75) Inventors: Vikram Goddu Surendra, Bangalore (IN); Srinivasa L. Rao L., Bangalore (IN); Gourav Chindlur Prabhakar, Bangalore (IN)

(73) Assignee: Motorola, Inc., Schaumburg, IL (US)

( * ) Notice: Subject to any disclaimer, the term of this patent is extended or adjusted under 35 U.S.C. 154(b) by 694 days.

(21) Appl. No.: 11/017,619

(22) Filed: Dec. 20, 2004

(65) Prior Publication Data

US 2006/0135192 A1 Jun. 22, 2006

(51) Int. Cl.
*H04B 7/00* (2006.01)

(52) U.S. Cl. .................. 455/518; 455/418; 455/414.1; 455/41.2

(58) Field of Classification Search .................. 455/518, 455/418, 517, 41.3, 41.2, 414.1; 370/342, 370/335, 441; 715/745, 866, 747
See application file for complete search history.

(56) References Cited

U.S. PATENT DOCUMENTS

| | | | | |
|---|---|---|---|---|
| 2002/0191776 A1* | 12/2002 | Khan | ............. | 379/266.07 |
| 2004/0042438 A1* | 3/2004 | Jiang et al. | ............. | 370/342 |
| 2005/0288000 A1* | 12/2005 | Harris et al. | ............. | 455/418 |
| 2005/0288048 A1* | 12/2005 | Rosen et al. | ............. | 455/518 |
| 2006/0056361 A1* | 3/2006 | Jiang et al. | ............. | 370/335 |

OTHER PUBLICATIONS

Open Mobile Alliance Ltd.; Push to Talk Cellular Requirement; Draft Version 1.0; Oct. 15, 2003.
Open Mobile Alliance Ltd.; OMA PoC Architecture Overview; Oct. 20, 2003.
Open Mobile Alliance Ltd.; OMA REQ Working Group PoC Requirements Overview; Oct. 23, 2003.
Open Mobile Alliance Ltd.; Liaison Statement; Dec. 18, 2003.

* cited by examiner

*Primary Examiner*—Tan Trinh

(57) ABSTRACT

A source SCR (106) coupled to a half-duplex radio communication system (100) includes a transceiver (202), and a processor (203) coupled to the transceiver. The source SCR and the half-duplex radio communication system are programmed to receive at the half-duplex radio communication system a monitor request message from a source SCR of the plurality of SCRs to determine a call availability status for each of a first list of at least one target SCR of a group member list of the source SCR, submit from the select one radio base station a call availability status request to each of the first list of at least one target SCR, submit from the half-duplex radio communication system to the source SCR a response state corresponding to the call availability status request of each of the first list of at least one target SCR, and update the group member list according to the response state for each of the first list of at least one target SCR.

20 Claims, 3 Drawing Sheets

106

MONITORING AVAILABILITY OF SELECTIVE CALL RADIOS IN A HALF-DUPLEX RADIO COMMUNICATION SYSTEM

FIELD OF THE INVENTION

This invention relates generally to half-duplex radio communication systems, and more particularly to monitoring availability of selective call radios in a half-duplex radio communication system.

BACKGROUND OF THE INVENTION

In a half-duplex radio communication system providing dispatch services to a number of conventional selective call radios (SCRs), generally referred to as "Walkie Talkies", it is not apparent if a half-duplex voice or data message transmitted by a source SCR to one or more target SCRs has been received other than by receiving a voice or data response back from each of the target SCRs.

The embodiments of the invention presented below overcome this disadvantage in the prior art.

SUMMARY OF THE INVENTION

Embodiments in accordance with the invention provide an apparatus and method for monitoring availability of selective call radios in a half-duplex radio communication system.

In a first embodiment of the present invention, a half-duplex radio communication system is coupled to a plurality of selective call radios (SCRs). The half-duplex radio communication system and the plurality of SCRs operate according to a method comprising the steps of receiving at the half-duplex radio communication system a monitor request message from a source SCR of the plurality of SCRs to determine a call availability status for each of a first list of at least one target SCR of a group member list of the source SCR, submitting from the half-duplex radio communication system a call availability status request to each of the first list of at least one target SCR, submitting from the half-duplex radio communication system to the source SCR a response state corresponding to the call availability status request of each of the first list of at least one target SCR, and updating the group member list according to the response state for each of the first list of at least one target SCR.

In a second embodiment of the present invention, a half-duplex radio communication system is coupled to a plurality of SCRs. The half-duplex radio communication system comprises at least one transceiver, and at least one processor coupled to the at least one transceiver. The half-duplex radio communication system and a source SCR of the plurality of SCRs are programmed to receive a monitor request message from a source SCR of the plurality of SCRs to determine a call availability status for each of a first list of at least one target SCR of a group member list of the source SCR, submit from the select one radio base station a call availability status request to each of the first list of at least one target SCR, submit from the half-duplex radio communication system to the source SCR a response state corresponding to the call availability status request of each of the first list of at least one target SCR, and update the group member list according to the response state for each of the first list of at least one target SCR.

In a third embodiment of the present invention, a source SCR is coupled to a half-duplex radio communication system. The source SCR comprises a transceiver, and a processor coupled to the transceiver. The source SCR and the half-duplex radio communication system are programmed to receive at the half-duplex radio communication system a monitor request message from a source SCR of the plurality of SCRs to determine a call availability status for each of a first list of at least one target SCR of a group member list of the source SCR, submit from the select one radio base station a call availability status request to each of the first list of at least one target SCR, submit from the half-duplex radio communication system to the source SCR a response state corresponding to the call availability status request of each of the first list of at least one target SCR, and update the group member list according to the response state for each of the first list of at least one target SCR.

DETAILED DESCRIPTION OF THE DRAWINGS

Figure 1:
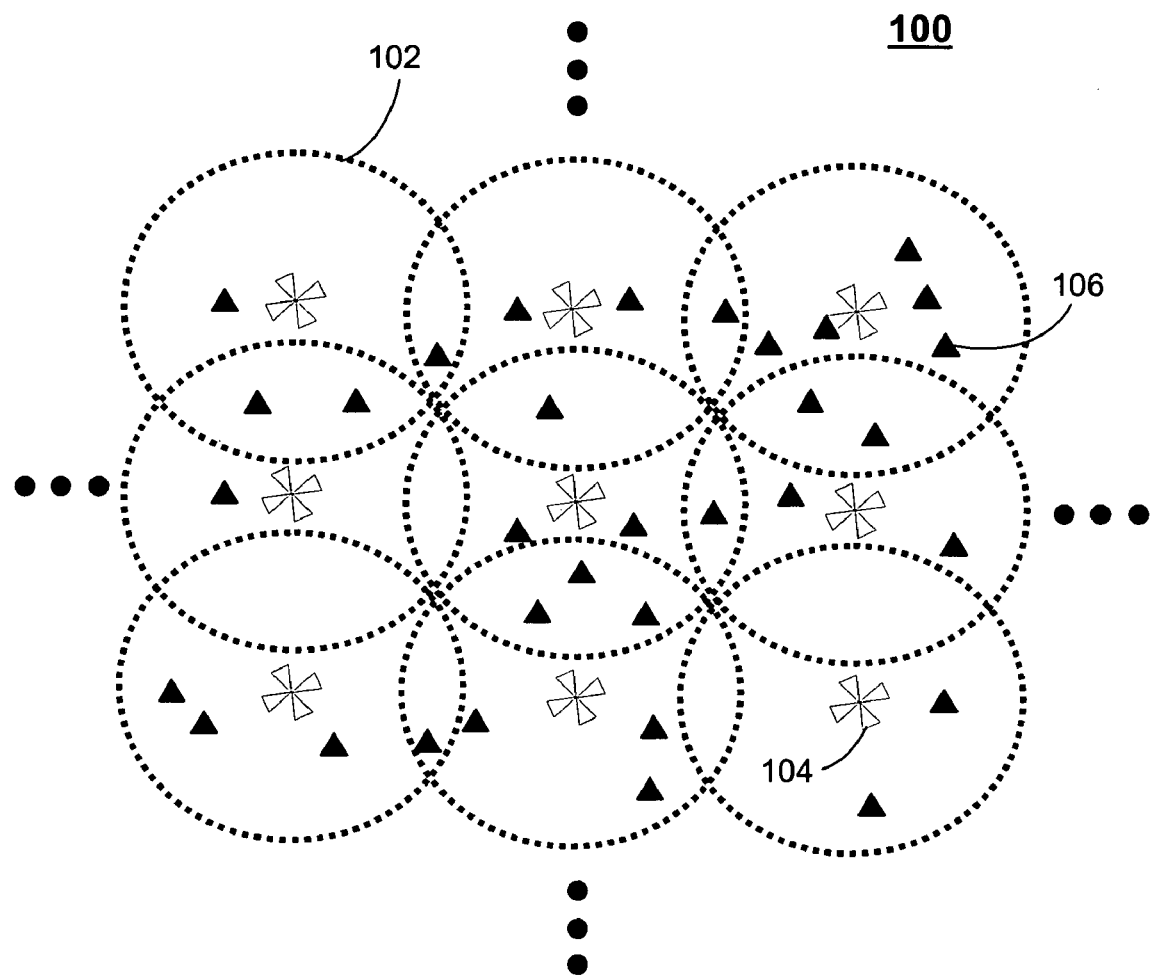
FIG. 1 is an illustration of a half-duplex radio communication system for communicating with a number of selective call radios (SCRS) in accordance with an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

Referring to FIG. 1, an illustration of a half-duplex radio communication system 100 for communicating with a number of SCRs 106 is shown. The half-duplex radio communication system 100 is a conventional wireless network comprising a plurality of radio base stations 104, each covering a geographic cell site 102, which in the aggregate cover, for example, a metropolitan area. Each radio base station 104 is capable of transmitting and receiving conventional half-duplex radio messages (commonly referred to as dispatch or "Walkie Talkie" messages) with the SCRs 106. In this system 100, the SCR 106 may take the form of a conventional cellular phone, or other radio communications device capable of transmitting and receiving conventional half-duplex radio dispatch voice and/or data messages.

Figure 2:
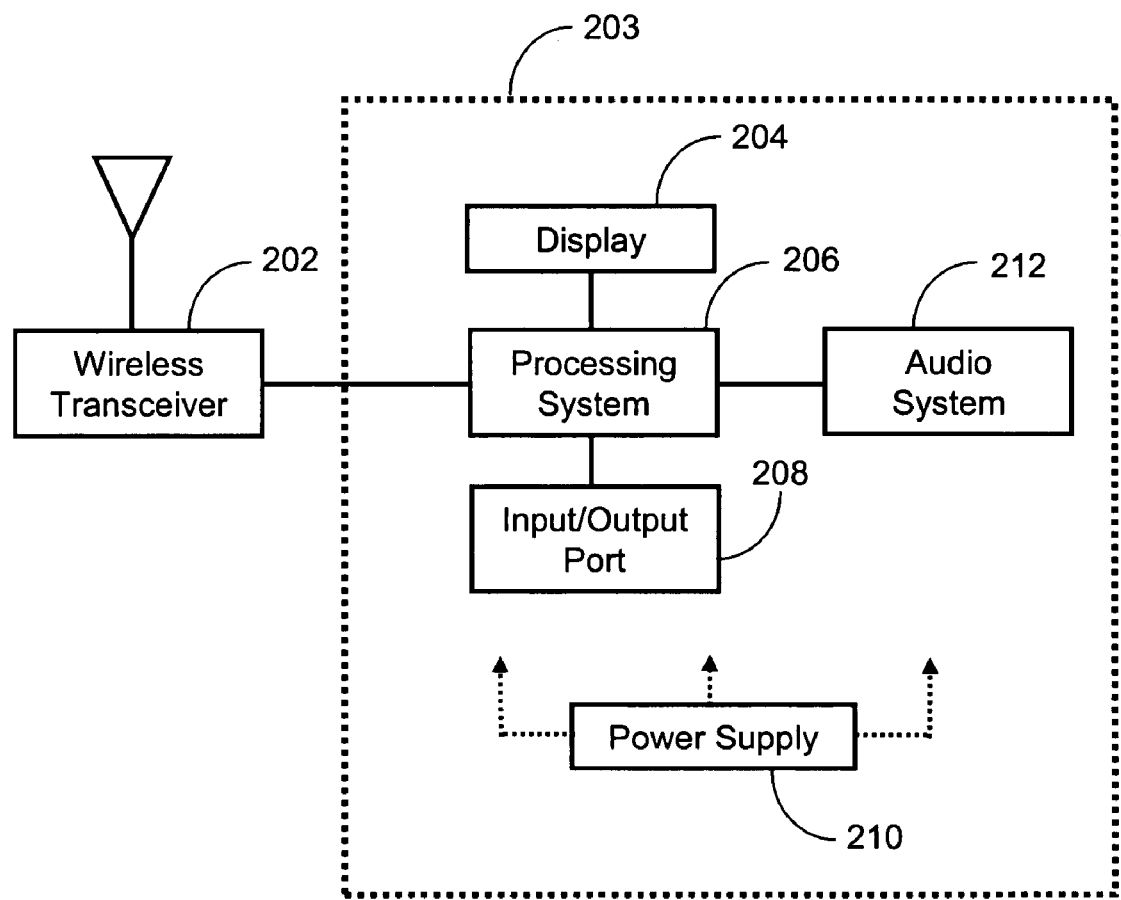
FIG. 2 is a block diagram of the SCR, or a radio base station of the half-duplex radio communication system of FIG. 1, in accordance with an embodiment of the present invention.

FIG. 2 is a block diagram of the SCR 106 in accordance with an embodiment of the present invention. The SCR 106 comprises conventional components such as a wireless transceiver 202 and a processor 203. The processor 203 includes a display 204, a processing system 206, an input/output port 208, a power supply 210 for supplying power to the elements of the SCR 106, and an audio system 212.

The processing system 206 utilizes conventional means such as a microprocessor, memory and software applications operating therein for controlling operations of the foregoing components 202-212 of the SCR 106 according to the invention described herein. The processing system 206 controls voice processing of conventional half-duplex radio messages using conventional protocols such as FRS (Family Radio Service), the iDEN™ dispatch protocol, or other similar protocols for half-duplex communications. The SCR 106 can further embody a cellular phone capable of processing full-duplex conventional messages that are transmitted and received according to conventional protocols such as CDMA (Code Division Multiple Access), GSM (Global System for Mobile communications), or other similar protocols for full-duplex communications.

The processing system 206 further provides a user of the SCR 106 the ability to process multi-media applications (e.g., video MPEG 4 player, video games, etc.), data message processing (e.g., downloading of software applications, SMS—short message system exchanges, etc.) and other house-keeping functions of the SCR 106.

Similar, to the SCR 106, FIG. 2 can represent an embodiment of the radio base stations 104 in accordance with an embodiment of the present invention. A difference between the SCR 106 and the radio base stations 104 is that the latter is immobile, while the former is mobile. In addition, the radio base stations 104 utilize conventional technology like the components 202-212 of FIG. 2 with, however, significantly higher performance and processing capability than the components 202 212 of the SCRs 106. For example, radio base stations 104 will generally transmit higher radiation power than the SCRs 106, utilize a multi-processor architecture for the processing system 206, and thereby require larger power supplies 210 for powering the components 202-212 of the radio base station 104.

In the foregoing embodiment, coordination of communications between the SCRs 106 and/or between the radio base stations 104 can be performed in a distributed manner since each of the radio base stations 104 has its own processor 203. In an alternative embodiment, the aforementioned coordination can be centralized by coupling the radio base stations 104 to a remote processor which is integrally part of the half-duplex radio communication system 100. The remote processor serves as the central point of coordination between the SCRs 106 and the radio base stations 104. In the foregoing embodiments, the radio base stations 104 are linked for inter communications by conventional wireless or wire line means.

Figure 3:
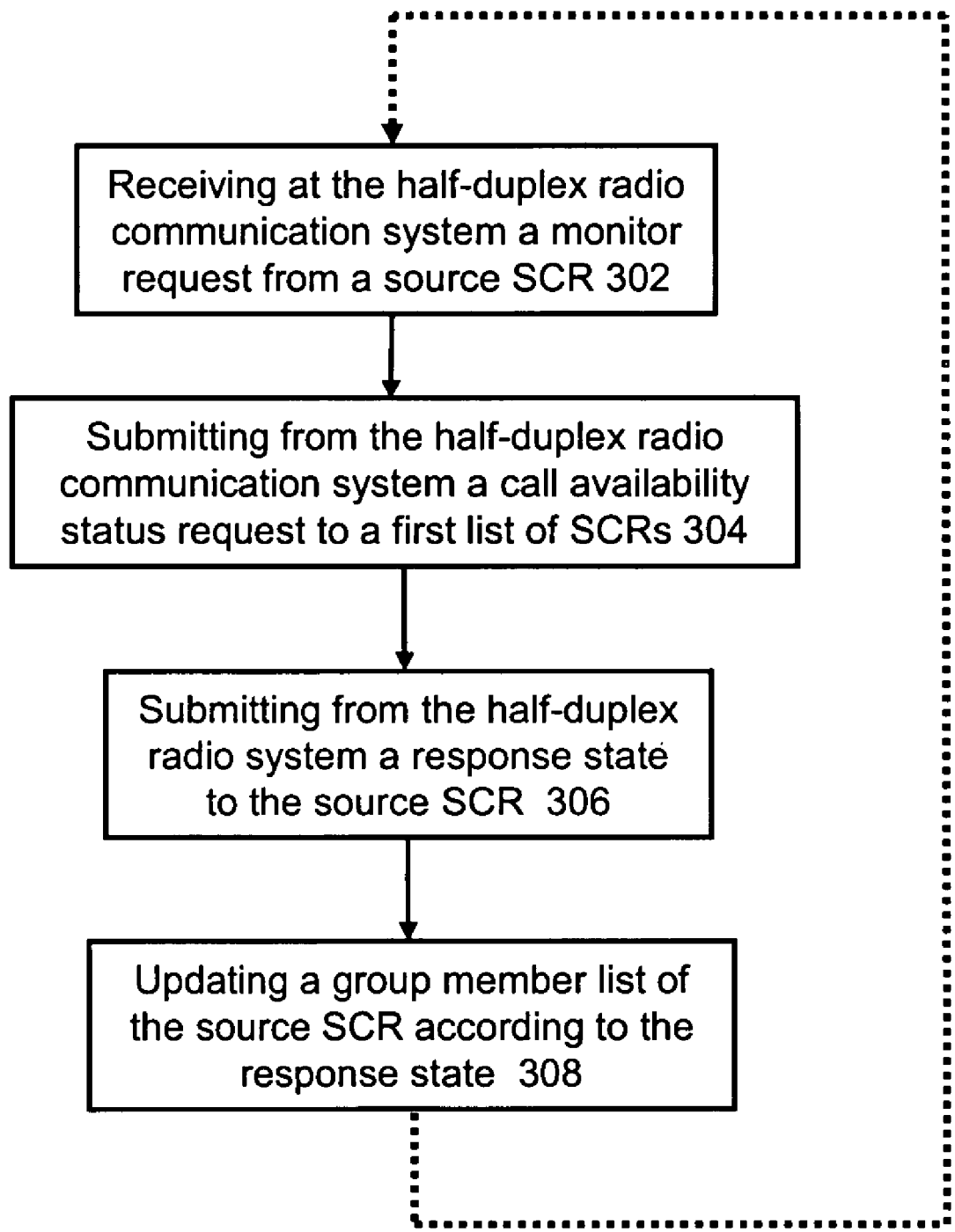
FIG. 3 is a flow chart depicting a method for monitoring availability of SCRs in the half-duplex radio communication system in accordance with an embodiment of the present invention.

FIG. 3 is a flow chart depicting a method 300 for monitoring availability of SCRs 106 in the half-duplex radio communication system 100 in accordance with an embodiment of the present invention. Method 300 as described below involves conventional point-to-point communications between the radio base stations 104 and the SCRs 106. These point-to-point communications further involve conventional handover techniques for SCRs 106 traversing from one cell site 102 to another. The foregoing activities are processed in a centralized or decentralized manner as described earlier.

We begin with step 302 where a monitor request message is received by the half-duplex radio communication system 100 from a source SCR 106 of the plurality of SCRs 106 of the half-duplex radio communication system 100. The monitor request message is sent by the source SCR 106 to determine a call availability status for each of a first list of at least one target SCR 106 of a group member list of the source SCR 106.

The group member list is stored in the memory of the processing system 206 of the source SCR 106, and comprises conventional selective call information corresponding to one or more target SCRs 106 of the plurality of SCRs 106 of the half-duplex radio communication system 100. The selective call information is used by a select one of the radio base stations 106 using any one of the conventional protocols referred to above to establish half-duplex radio communications between the source SCR 106 and any one or all of the target SCRs 106 of the first list.

The call availability status represents the availability of one or more target SCRs 106 of the first list to receive a half-duplex radio message from the source SCR 106. The first list comprises a subset or a complete listing of selective call information corresponding to the target SCRs 106 in the group member list. Accordingly, a user of the source SCR 106 can monitor the availability of a portion or all of the target SCRs 106 listed in the group member list to receive half-duplex radio messages from the source SCR 106.

In step 304, the half-duplex radio communication system 100 submits a call availability status request to each of the first list of target SCRs 106. The call availability status request is a message which prompts each target SCR 106 of the first list to transmit a corresponding message to the half-duplex radio communication system 100 indicating its availability to accept half-duplex radio messages from the source SCR 106.

In the event one or more of the target SCRs 106 is turned off, is out of radio coverage of the half-duplex radio communication system 100, or is busy with an active half-duplex radio exchange with another SCR 106, the half-duplex radio communication system 100 will record the state of such target SCRs 106 as unavailable for receiving half-duplex radio messages from the source SCR 106. Messages received from other target SCRs 106 indicating their availability to receive half-duplex radio messages from the source SCR 106 are recorded by the half-duplex communication system 100 as available.

In step 306 the half-duplex radio communication system 100 submits a radio message to the source SCR 106 comprising a response state corresponding to the call availability status request of each of the first list of target SCRs 106. The response state of a particular target SCR 106 indicates whether it is or is not available to receive half-duplex messages from the source SCR 106. The source SCR 106 in step 308 updates the group member list according to the response state of each of the target SCRs 106.

In a supplemental embodiment of the present invention, steps 302-308 can be repeated periodically as shown by the flow chart of FIG. 3. In this embodiment, a user of the SCR 106 can select an option to periodically monitor a first list of target SCRs 106. Alternatively, this embodiment can be eliminated in which case the method 300 is invoked once every time the user of the source SCR 106 requests to monitor the first list of target SCRs 106.

The invention can be further supplemented by programming the source SCR 106 to present the updated group member list to a user of the source SCR 106. The presentation can be performed by way of the display 204 and/or audibly by way of the audio system 212.

In yet another embodiment of the present invention, the source SCR 106 is programmed to select a second list from the updated group member list. The second list is generated by the source SCR 106 according to the target SCRs 106 from the first list that are detected as available for communication. Alternatively, the second list can be generated according to one or more target SCRs 106 selected by a user of the SCR 106 from the first list of target SCRs 106 detected as available for communication.

Once the second list is has been selected, the SCR 106 establishes a half-duplex radio communication link between the source SCR 106 and the second list of target SCRs. From this point, voice and/or data half-duplex dispatch messages are exchanged between the source SCR 106 and target SCRs 106 of the second list.

These exchanges take place in a half-duplex group setting. That is, any one of the target SCRs 106 and the source SCR 106 can communicate with the group at a select moment in time when the other members are not communicating.

Accordingly, each of the non-communicating SCRs 106 listens to the communications of a select SCR 106.

The embodiments of the invention described above can be further supplemented with a step that establishes affiliations between the plurality of SCRs 106. The affiliations provide selective associations between the SCRs 106 so as to enable one SCR 106 to communicate with another SCR 106 in a group setting. From these affiliations group member lists are generated for each of the SCRs 106. Each entry of the group member list represents conventional selective call information for communicating to any one of the target SCRs 106 of the group.

In a first embodiment, the affiliations can be established by the half-duplex radio communication system 100. In this embodiment, personnel managing the half-duplex radio communication system 100 by way of a conventional terminal coupled to the input/output port 208 provide the affiliations to be applied across the population of SCRs 106. In a second embodiment, affiliations are assigned by the SCR 106. In this embodiment, a user of the SCR 106 selects which target SCRs 106 it wishes to affiliate with the SCR 106. To accomplish this step, the user enters in the memory of the SCR 106 selective call information of target SCRs 106 it wishes to add to the group member list.

In yet another supplemental embodiment of the present invention, the first list of target SCRs 106 responding in the affirmative to the call availability status request can be programmed to block incoming calls other than from the source SCR 106. This step provides the source SCR 106 assurance that half-duplex messages transmitted to the foregoing target SCRs 106 will be received barring communication errors in the half-duplex radio communication system 100.

In an alternative embodiment, the source SCR 106 can be programmed to establish a half-duplex communication link with the target SCRs 106 of the group member list prior to submitting the monitor request message to the half-duplex radio communication system 100. In this embodiment the source SCR 106 monitors the likelihood the foregoing target SCRs 106 will receive messages from the source SCR 106. This is accomplished by invoking steps 302-308 of method 300 after the source SCR 106 has transmitted a message to the target SCRs 106. This embodiment can be applied after each message transmitted by the source SCR 106 or just after the first message.

In light of the foregoing description, it should be recognized that embodiments in the present invention could be realized in hardware, software, or a combination of hardware and software. These embodiments could also be realized in numerous configurations contemplated to be within the scope and spirit of the claims below.

It should also be understood that the claims are intended to cover the structures described herein as performing the recited function and not only structural equivalents. The claims are sufficiently general to include equivalent structures. For example, a software implementation of method 300 described above and a hardware implementation of the same method 300 may not be structural equivalents in that the software implementation is dependent on a processing system 206 for execution, while the hardware implementation may have self-contained processing means to execute the same operation. It is well known in the art, however, that software and hardware implementations may be designed so as to operate as equivalent structures generating the same results. Accordingly, all equivalent modifications and/or additions to the invention described above are intended to be within the scope and spirit of the claims recited herein.

What is claimed is:

1. In a half-duplex radio communication system coupled to a plurality of selective call radios (SCRs), a method comprising the steps of:

receiving at the half-duplex radio communication system a monitor request message from a source SCR of the plurality of SCRs to determine a call availability status for each of a first list of at least one target SCR of a group member list of the source SCR;

submitting from the half-duplex radio communication system a call availability status request to each of the first list of at least one target SCR;

submitting from the half-duplex radio communication system to the source SCR a response state corresponding to the call availability status request of each of the first list of at least one target SCR; and updating the group member list according to the response state for each of the first list of at least one target SCR, wherein the method further comprises the alternative set of steps among a first set of establishing a half-duplex radio communication link between the source SCR and the first list of at least one target SCR responding in the affirmative and submitting a half-duplex message from the source SCR to the first list of at least one target SCR responding in the affirmative or a second set of selecting a second list of at least one target SCR from the updated group member list and establishing a half-duplex radio communication link between the source SCR and the second list of at least one target SCR.

2. The method of claim 1, further comprising the step of presenting the updated group member list to a user of the source SCR.

3. The method of claim 1, further comprising the steps of:
selecting a second list of at least one target SCR from the updated group member list; and
establishing a half-duplex radio communication link between the source SCR and the second list of at least one target SCR.

4. The method of claim 1, further comprising the steps of:
establishing affiliations between the plurality of SCRs; and
generating the group member list for each of the plurality of SCRs according to the preceding affiliations.

5. The method of claim 4, wherein the affiliations are established by one among a group comprising each of the plurality of SCRs and the half-duplex radio communication system.

6. The method of claim 1, further comprising the steps of:
blocking incoming calls other than from the source SCR at the first list of at least one target SCR responding in the affirmative to the call availability status request;
establishing a half-duplex radio communication link between the source SCR and the first list of at least one target SCR responding in the affirmative; and
submitting a half-duplex message from the source SCR to the first list of at least one target SCR responding in the affirmative.

7. The method of claim 1, further comprising the steps of:
establishing at the source SCR communication a half-duplex radio communication link with the group member list prior to submitting the monitor request message to the half- duplex radio communication system;
submitting a half-duplex message from the source SCR to the first list of at least one target SCR; and
presenting the updated group member list to a user of the source SCR, the updated group member list indicating which of the first list of at least one target SCR received the half-duplex message.

8. A half-duplex radio communication system coupled to a plurality of SCRs, comprising
 a plurality of radio base stations coupled to the plurality of SCRs;
 wherein elements of the half-duplex radio communication system and a source SCR of the plurality of SCRs are programmed to:
 receive a monitor request message from a source SCR of the plurality of SCRs to determine a call availability status for each of a first list of at least one target SCR of a group member list of the source SCR;
 submit from the select one radio base station a call availability status request to each of the first list of at least one target SCR;
 submit from the half-duplex radio communication system to the source SCR a response state corresponding to the call availability status request of each of the first list of at least one target SCR;
 update the group member list according to the response state for each of the first list of at least one target SCR; and
 alternatively establish a half-duplex radio communication link between the source SCR and the first list of at least one target SCR responding in the affirmative and submit a half-duplex message from the source SCR to the first list of at least one target SCR responding in the affirmative or select a second list of at least one target SCR from the updated group member list and establish a half-duplex radio communication link between the source SCR and the second list of at least one target SCR.

9. The half-duplex radio communication system of claim 8, further comprising the step of presenting the updated group member list to a user of the source SCR.

10. The half-duplex radio communication system of claim 8, further comprising the steps of:
 selecting a second list of at least one target SCR from the updated group member list; and
 establishing a half-duplex radio communication link between the source SCR and the second list of at least one target SCR.

11. The half-duplex radio communication system of claim 8, further comprising the steps of:
 establishing affiliations between the plurality of SCRs; and
 generating the group member list for each of the plurality of SCRs according to the preceding affiliations.

12. The half-duplex radio communication system of claim 11, wherein the affiliations are established by one among a group comprising each of the plurality of SCRs and the half-duplex radio communication system.

13. The half-duplex radio communication system of claim 8, further comprising the steps of:
 blocking incoming calls other than from the source SCR at the first list of at least one target SCR responding in the affirmative to the call availability status request;
 establishing a half-duplex radio communication link between the source SCR and the first list of at least one target SCR responding in the affirmative; and
 submitting a half-duplex message from the source SCR to the first list of at least one target SCR responding in the affirmative.

14. A source SCR coupled to a half-duplex radio communication system, comprising
 a transceiver; and
 a processor coupled to the transceiver;
 wherein the source SCR and the half-duplex radio communication system are programmed to:
 receive at the half-duplex radio communication system a monitor request message from a source SCR of the plurality of SCRs to determine a call availability status for each of a first list of at least one target SCR of a group member list of the source SCR;
 submit from the select one radio base station a call availability status request to each of the first list of at least one target SCR;
 submit from the half-duplex radio communication system to the source SCR a response state corresponding to the call availability status request of each of the first list of at least one target SCR;
 update the group member list according to the response state for each of the first list of at least one target SCR; and
 alternatively establish a half-duplex radio communication link between the source SCR and the first list of at least one target SCR responding in the affirmative and submit a half-duplex message from the source SCR to the first list of at least one target SCR responding in the affirmative or select a second list of at least one target SCR from the updated group member list and establish a half-duplex radio communication link between the source SCR and the second list of at least one target SCR.

15. The source SCR of claim 14, further comprising the step of presenting the updated group member list to a user of the source SCR.

16. The source SCR of claim 14, further comprising the steps of:
 selecting a second list of at least one target SCR from the updated group member list; and
 establishing a half-duplex radio communication link between the source SCR and the second list of at least one target SCR.

17. The source SCR of claim 14, further comprising the steps of:
 establishing affiliations between the plurality of SCRs; and
 generating the group member list for each of the plurality of SCRs according to the preceding affiliations.

18. The source SCR of claim 17, wherein the affiliations are established by one among a group comprising each of the plurality of SCRs and the half-duplex radio communication system.

19. The source SCR of claim 14, further comprising the steps of:
 blocking incoming calls other than from the source SCR at the first list of at least one target SCR responding in the affirmative to the call availability status request;
 establishing a half-duplex radio communication link between the source SCR and the first list of at least one target SCR responding in the affirmative; and
 submitting a half-duplex message from the source SCR to the first list of at least one target SCR responding in the affirmative.

20. The source SCR of claim 14, further comprising the steps of:
 establishing at the source SCR communication a half-duplex radio communication link with the group member list prior to submitting the monitor request message to the half- duplex radio communication system;
 submitting a half-duplex message from the source SCR to the first list of at least one target SCR; and
 presenting the updated group member list to a user of the source SCR, the updated group member list indicating which of the first list of at least one target SCR received the half-duplex message.

* * * * *